Nov. 23, 1937.　　　J. P. L. LAFFITTE　　　2,099,693
GRIDIRON
Filed Jan. 25, 1936　　　2 Sheets-Sheet 1

Nov. 23, 1937.    J. P. L. LAFFITTE    2,099,693
GRIDIRON
Filed Jan. 25, 1936    2 Sheets-Sheet 2
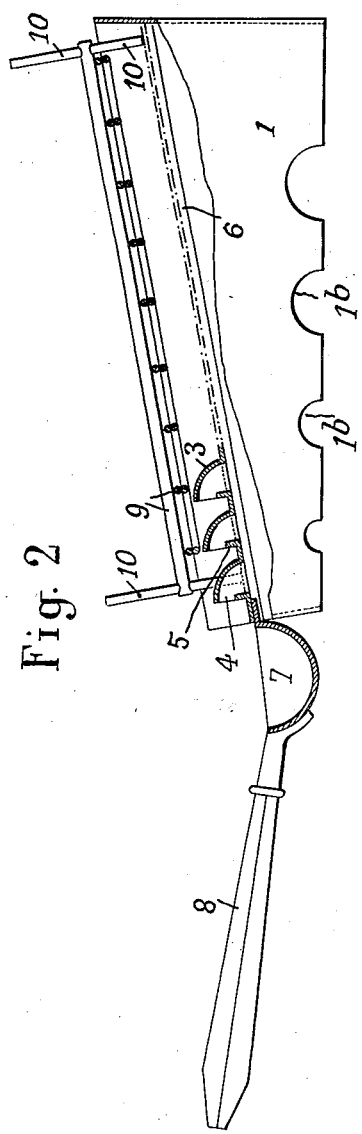
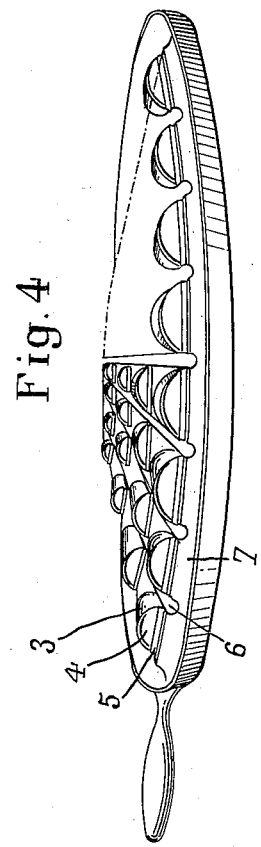

Patented Nov. 23, 1937

2,099,693

UNITED STATES PATENT OFFICE 2,099,693

GRIDIRON

Jacques Paul Louis Laffitte, Paris, France

Application January 25, 1936, Serial No. 60,855
In France January 25, 1935

4 Claims. (Cl. 53—5)

Various arrangements have been hitherto conceived in order to prevent the fats and juices arising from the meat placed on a grill from falling on to the hearth. These arrangements unfortunately present the serious disadvantage of allowing the fats to be in too prolonged a contact with the overheated air and thereby permitting its burning which has the effect of charring the meat.

The present invention has for an object a grill constituted so as to confine the overheated air arising from the oven below the meat to be grilled to increase the surface of radiation and to permit rapid discharge of the fats and juices while preventing their falling on to the hearth and protecting them as much as possible during their discharge from contact with the overheated air.

The present grill is constituted essentially by an inclined plate provided with openings which allow the overheated air to pass while preventing the fats and juices from falling into the oven, the said openings whose plane is sensibly perpendicular to the plate being masked vertically by projections of the material constituting the plate, the projections being made with a view to obtaining the said openings.

These openings are provided over their front lower part, with ledges which prevent the fat and juices from falling on to the plate in front of the openings from passing through the latter and also of approaching the surface exposed to the flame on account of capillarity.

Between the openings arranged in rows longitudinal channels are provided intended to conduct the fats and juices which flow from the meat during cooking towards a wide transversal spout provided at the lower part of the inclined plate or independent of this plate.

In order to define the mode of action of the plate thus constituted as well as the reasons for its superiority over the hitherto known arrangements I shall show that it is constructed in such a manner:

1. That the meat may be grilled:

(a) By a current of overheated air which attacks this meat as soon as it is placed above the plate thereby producing rapid coagulation of the albumens and thus preventing the issue of muscular plasm;

(b) By direct radiation, the heating surface being increased by the embossments provided on the said surface;

2. That the greases and fats flow through the channels provided in the plate in the direction of the lower collector traversing a minimum and straight path on the inclined warm plate;

3. That the very rapid escape of overheated air:

(a) Ensures the good cooking of the meat.

(b) Drives the drops of fat or juice which issue from the meat when cooking and prevents them from penetrating into the interior of the said perforations.

(c) Produces rapid extinction of the flame in the case of burning of the fats.

4. That the fats and juices are prevented from moistening by capilarity the surface in contact with the flame, thereby reducing to a minimum the risk of the fatty vapours burning through the lower ledges of the openings which have been hereinbefore mentioned.

The grill plate such as has been described above may be used alone but then the meat resting only on the summits of the hollow embossments of the plate has a tendency to sink between the points of support. For certain very soft or very thin meats this sinking would be prejudicial to their serving and also to cooking, the warm air circulating less completely below the meat. In this case provision has also been made for placing above the mentioned plate a highly perforated support but having continuous lines of support in order to permit the meat to rest sensibly plane during the cooking. This support may also be used with advantage for grilling fish.

In one preferred mode of embodiment the grill plate is supported by a support provided for giving it its inclination and also for forming a kind of box closed on the four sides at the bottom only of which are provided some openings in such a way that this support plays the part of a chimney accentuating the draught of warm air through the openings of the plate and that of a warm chamber distributing the heat uniformly.

In order to grill the meat, for example, this meat may be placed directly on the plate or even on the highly perforated support which has been hereinbefore mentioned. The distance between the plate and this support can be varied and adjusted according to the results to be obtained, for example, by providing the support with feet on both sides and of different heights or by the aid of grooves provided in the support in order to mount the support at a greater or smaller distance from the plate.

The attached drawings show by way of example, two embodiments of the grill which is the object of the invention:

Figure 2 is a side view of same.

Figure 4 shows in perspective a second embodiment of the plate of the grill.

Figure 1:
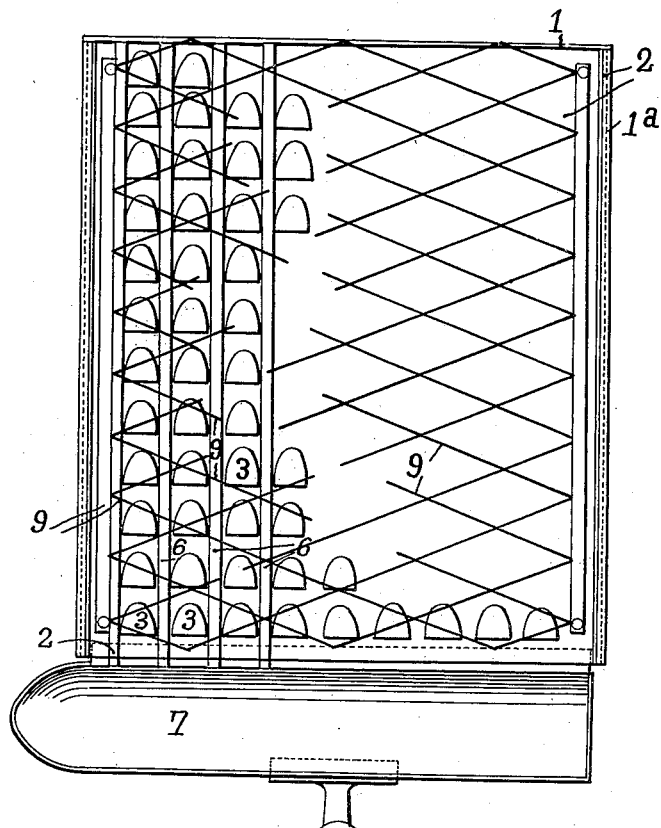
Figure 1 is a partly diagrammatic plan view of a first embodiment.
Figure 3:
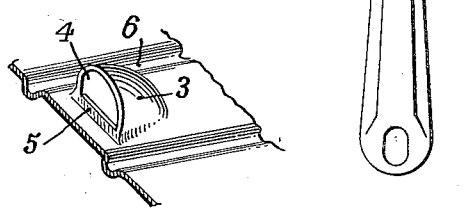
Figure 3 is a detailed view in section on a large scale of an open embossment of the plate.

As will be seen in the drawings the apparatus comprises a support 1 in the form of a box the sides of which have the form of a trapezium so that the lateral sides and a hollowed-out groove 1a which is parallel to it have a determined slope. The two edges of the plate 2 which form the principal elements of the grill engage in the two grooves 1a by sliding with little friction.

Openings 1b are cut out in the lower part of the side of the box forming lateral air inlets for actuating the draught of warm air.

The plate 2 presents rows of embossments 3 obtained by hollowing out, founding or moulding, the front face of which, sensibly perpendicular to the plane of the plate, presents in its upper part an opening 4 above which is provided a ledge 5. On account of the fact that the plate is sloped during use each opening 4 is masked vertically by the material of the embossment in such a way that these openings 4 which allow the warm air leaving the box 1 to pass, cannot be traversed in the reverse direction by the fats and juices which flow over the plate or fall in front of the said openings. In this latter case the ledges 5 entirely prevent the juices and fats from passing into these openings.

Between the rows of embossments 3 with openings 4 are provided longitudinal channels 6 intended to conduct the fats and juices to a large transversal spout 7 provided at the lower part of the inclined plate 2 and provided with a sleeve 8 which allows the assembly of the plate and said spout to be manoeuvred. As will be understood use can also be made of a spout or other receptacle independent of the plate 2 below the lower edge of which it is simply placed when using the grill.

In certain cases as has been explained above a highly perforated support 9 for example of extended metal or constituted by a large metal trellis is placed above the plate 2. This support may be simply placed on the plate but it can be preferably provided with feet 10 on its two faces and of different height on each one of these faces in such a way as to vary the distance of the meat or fish with respect to the currents of warm air by reversing it.

Several grooves can also be provided on the sides of the box at different heights for sliding this support.

As will be understood the invention is not limited to this mode of embodiment but it includes all variations resulting for example from changes in the shape of the open embossments or from their replacement by equivalent arrangements.

Thus the plate which particularly characterizes the present invention may have various forms and in particular besides the plane form provided in the above description, a conical or truncated shape (see Figure 4).

The perforations on the one plate may be of equal or different dimensions according to their position with respect to the source of heat.

In the conical form in particular their dimension can increase from the top towards the base of the cone as shown (Figure 4).

The grill may be made of any material, good or bad conductors of heat according to the result to be obtained in cooking.

Having now fully described the invention what is claimed as new and desired to be secured by Letters Patent is:—

1. A grill for the preparation of grilled foods including a plate provided with channels for the collection of juices and greases and with openings for the heated grilling air or gases, said openings being arranged at approximately right angles to the plane of said plate and spaced from the upper surface of the plate, while being directed approximately parallel to the channels whereby the hot gases are prevented from coming into contact with the greases or the like that are expelled from the grilled substance when being grilled.

2. A grill for the preparation of grilled foods and the like including an inclined plate provided with a series of embossed portions, the lower ends of the embossed portions having openings permitting the passage of the heated grilling air or gases, said openings being arranged at approximately right angles to the plane of said plate and spaced from the plate, whereby the hot gases are prevented from coming into contact with the greases or the like that are expelled from the grilled substances onto said plate when being grilled.

3. A grill for the preparation of grilled foods and the like including an inclined plate provided with a series of suitably spaced and longitudinally extending grease collecting canals, a series of suitably spaced embossed portions on the plate between the canals, said portions extending approximately in the direction of the canals and having the lower ends provided with openings spaced from the plate and arranged in a plane at right angles to the plane of the plate, whereby the hot gases are prevented from coming into contact with the greases or the like that are expelled from the grilled substance onto said plate when being grilled.

4. A grill as claimed in claim 2, in which said embossed portions in plan are approximately semi-elliptical in shape and gradually rise in curved formation from the upper to the lower edges, the lower edges being positioned at approximately right angles to the plate and having the openings therein, each opening being spaced from the plate so as to leave a ledge.

JACQUES PAUL LOUIS LAFFITTE.